UNITED STATES PATENT OFFICE.

JEFFREY STEWART, OF PHILADELPHIA, PENNSYLVANIA, ASSIGNOR TO E. I. DU PONT DE NEMOURS AND COMPANY, OF WILMINGTON, DELAWARE, A CORPORATION OF DELAWARE.

PROCESS OF OBTAINING OILS.

1,276,822. Specification of Letters Patent. Patented Aug. 27, 1918.

No Drawing. Application filed October 27, 1915. Serial No. 58,201.

*To all whom it may concern:*

Be it known that I, JEFFREY STEWART, of Philadelphia, in the county of Philadelphia and in the State of Pennsylvania, have invented a certain new and useful Improvement in Processes of Obtaining Oils, and do hereby declare that the following is a full, clear, and exact description thereof.

My invention relates particularly to a process designed for obtaining oils by the treatment of the "foots" left as a residue in the refining of animal and vegetable oils.

Animal and vegetable oils are refined or neutralized by adding thereto a quantity of alkali in solution at a given temperature, preferably a solution of caustic soda in water. The result of this treatment is to produce below the layer of oil treated, a lower layer of a residue of "foots," containing soap stock, mucilage, etc., which is comprised largely of sodium, oleate, free fatty acids, together with some sediment or impurities separated from the oils that have been so treated. The lower layer also contains a small percentage of neutral fat which is carried down with the other constituents of the lower layer. Hitherto it has been customary to decompose the materials contained in these residues by adding sulfuric acid. This results, however, in partially carbonizing the mucilaginous matters, so that the resulting oils obtained are dark in color and of less value commercially for this reason. Also there is a more or less imperfect separation between the body of sulfuric acid added and the residues treated.

The object of my invention is to treat the lower layer obtained in this manner in such a way as to produce an oil having a lighter color, and so as to obtain a more perfect and sharp separation between the watery materials added and the residues treated thereby.

While my invention is capable of being carried out in many ways, for the purpose of illustration, I shall describe only one way of carrying out the same.

In carrying out my process, one method of procedure might be as follows. After the body of oil has been treated with a solution of caustic soda in water, thereby producing a lower layer of "foots" containing soap stock, mucilage, etc., this lower layer of residues is separated from the oils thus refined, and is then treated with a solution of niter cake, that is to say, the cake obtained as a by-product in the manufacture of nitric acid by the action of sulfuric acid upon a nitrate, such as sodium nitrate. This niter cake contains acid sodium sulfate, which decomposes the soaps in said residues, thus liberating free fatty acids. The action is such, however, as not to char or carbonize any of the mucilaginous matters in the materials so treated, so that the resulting oil separated in this manner from the residues has a lighter color than was previously obtainable by the treatment with sulfuric acid. There is, furthermore, a sharper separation of the watery materials from the oily materials, which is due largely to the higher specific gravity of the watery materials. Furthermore, niter cake, being a by-product in the manufacture of nitric acid, is obtainable at a very low price, so that the process, as a whole, may be carried out more cheaply than the process previously made use of in treating the residues from the refining of oils. Any desired quantity of the niter cake may be added in the process, though preferably 150 pounds of the niter cake is added to a quantity of the residues obtained from a body of oil refined by the addition thereto of 40 pounds of pure caustic alkali.

While I have described my invention above in detail, I wish it to be understood that many changes may be made therein without departing from the spirit of my invention.

I claim:—

1. The process which comprises treating residues obtained from the refining of oils through the addition of an alkali, and the separation of the residues from the refined oil by adding to the residues an acid sulfate.

2. The process which comprises treating residues obtained from the refining of oils through the addition of an alkali, and the separation of the residues from the refined oil by adding to the residues an acid sulfate of sodium.

3. The process which comprises treating residues obtained from the refining of oils through the addition of an alkali, and the separation of the residues from the refined oil by adding to the residues a quantity of niter cake.

In testimony that I claim the foregoing I have hereunto set my hand.

JEFFREY STEWART.

Witnesses:
JOSEPH H. TAULANE,
EDWARD J. KIRCHNER.